United States Patent

[11] 3,622,997

[72] Inventors Luigi Casella;
Aldo Perna; Giuseppe Valbonesi, all of Milan, Italy
[21] Appl. No. 29,781
[22] Filed Apr. 20, 1970
[45] Patented Nov. 23, 1971
[73] Assignee Societa Italiana Telecomunicazioni Siemens S.p.A.
Milan, Italy
[32] Priority Apr. 18, 1969
[33] Italy
[31] 15734A/69

[54] SIGNAL DISCRIMINATOR FOR TIME-SHARING COMMUNICATION SYSTEM HAVING PERIODIC LINE SAMPLING
6 Claims, 6 Drawing Figs.

[52] U.S. Cl. 340/167, 340/147
[51] Int. Cl. H04g 3/00
[50] Field of Search 340/167, 147

[56] References Cited

UNITED STATES PATENTS 3,204,037 8/1965 Hartley 179/18.7 YA

*Primary Examiner*—Harold I. Pitts
*Attorney*—Karl F. Ross

ABSTRACT: To distinguish between DC pulses of different length detected by periodic sampling of a given transmission line, a data processor evaluates a combination of criteria including the instantaneously sampled line voltage (A), the continuity or lack of continuity of that voltage for a prolonged period ($D_8'$), and the output of the data processor in a preceding sampling interval. This output is preserved, for subsequent reevaluation, in the form of a digital code stored in a time slot of a circulating memory assigned to the line under test. Some of the output signals of the data processor identify transitory conditions which, in the next evaluation cycle, must be converted into one of two possible definite conditions recognized as significant line-voltage criteria.

Luigi Casella
Aldo Perna
Giuseppe Valbonesi
INVENTORS.

BY

Karl G. Ross
Attorney

Luigi Casella
Aldo Perna
Giuseppe Valbonesi
INVENTORS.

BY

Karl F. Ross
Attorney

Luigi Casella
Aldo Perna
Giuseppe Valbonesi
INVENTORS.

BY

Karl F. Ross
Attorney

Luigi Casella
Aldo Perna
Giuseppe Valbonesi
INVENTORS.

BY

Karl F. Ross
Attorney

SIGNAL DISCRIMINATOR FOR TIME-SHARING COMMUNICATION SYSTEM HAVING PERIODIC LINE SAMPLING

Our present invention relates to a telecommunication system with one or more channels, such as telephone subscriber lines, each having two significant states of energization which are subject to changeover at intervals of different duration. More specifically, it concerns a telecommunication system of the time-sharing or time-division-multiplex (TDM) type wherein a multiplicity of such channels are successively sampled during a scanning cycle lasting for a small fraction of a second, e.g., at a rate of 100 subscriber lines within a scanning period of 100$\mu$sec.

Systems have already been devised for ascertaining, with the aid of suitable storage means, the length of a DC signal such as those generated when a telephone subscriber closes his hook switch, transmits a dialing pulse or restores his receiver. In commonly owned copending application Ser. No. 771,770, now U.S. Pat. No. 3,560,662, for example, filed by Luigi Casella and Giorgio de Varda on Oct. 30, 1968, there has been disclosed a system of this nature using a circulating memory as the storage means, this memory comprising several parallel delay lines (usually four) which recirculate a given digital code, assigned to a specific line or channel, with an operating cycle equal to a scanning cycle whereby this code is periodically reproduced every 100$\mu$sec. under the conditions assumed above. Such a circulating memory, also disclosed in other commonly owned copending applications (Ser. No. 676,135, filed Oct. 18, 1967, now U.S. Pat. No. 3,551,598, by Giorgio de Varda and Saverio Martinelli; Ser. No. 735,606, filed June 10, 1968, by Giorgio de Varda, Saverio Martinelli and Aldo Perna), has a multiplicity of time slots or phases (e.g. 100), assigned to different lines sampled by the scanner, whereby code words identifying the state of operation of all these lines can be registered and concurrently recirculated for periodic reproduction.

In the system of application Ser. No. 771,770, a sampling pulse is generated after a predetermined number of scanning cycles to produce an input signal for a logic network which also receives the output of the circulating memory to derive therefrom a variety of output signals that are then again recirculated; after a certain number of sampling periods, a test pulse occurs which converts one group of output signals, indicative of the state of energization "0," into a first type of transition signal and converts another group of output signals, indicative of the state of energization "1," into another type of transition signal; if the state of energization of the line is not significantly changed upon the next recurrence of the test pulse, the transition signal is transformed into a permanent signal identifying either an open or a closed line circuit. As a safeguard against false operation in response to spurious line voltages or currents, the logic network has several groups of output circuits to carry either a so-called stable signal, recognized as a significant criterion for the line voltage, or a so-called unstable form which may be due to either a transient of a beginning changeover and which therefore requires subsequent verification in the next sampling period or periods.

The principal object of our invention is to provide a system of this general type adapted to discriminate not only between relatively long and relatively short DC signals but also among various relatively short pulses of different duration, the term "pulse" referring to a temporary state of energization which may be either "0" or "1" so as to cover both the application and the interruption of line voltage.

A more particular object is to provide also in this system a measure of protection against spurious transients.

A further specific object is to provide a signal discriminator adapted to distinguish between "dots" and "dashes" in a system designed for the transmission in intelligence by Morse code or similar combinations of longer and shorter pulses.

In accordance with the instant invention, we provide a data processor whose input periodically receives a sample of the state of energization (e.g., line voltage) of an associated channel to be tested, the processor including a counter under the control of a detector for ascertaining a change in the input signal from one evaluation period to the next which would indicate a changeover in the state of energization of the channel; in the absence of such a change, the counter is stepped during each evaluation period to count a predetermined number of such periods and, if not prematurely reset by a changeover signal from the detector, to generate a continuity signal which is fed into a logic matrix of the processor together with the instant input signal for giving rise to a corresponding output signal.

According to a more particular feature of our invention, the output signal generated by the data processor is preserved for one or more test periods in a storage means such as the above-described circulating memory whence it is retrieved during the next test period for return to the logic matrix to enter into the evaluation process and to help generate the new output signal.

A further feature of our invention resides in the division of the output circuits of the logic matrix into two groups, i.e., an external and an internal group, the external output circuits being energizable to carry a stable signal recognized as a significant criterion for the state of energization whereas the internal output circuits are energized only in the presence of unstable or transition signals requiring further verification. Whereas both groups of output circuits are connected to the memory for recirculation of their respective signals, only the external outputs are generally utilized to operate readout devices indicating the detection of a specific line signal.

The above and other features of our invention will be described in detail hereinafter with reference to the accompanying drawing in which.

Figure 1:
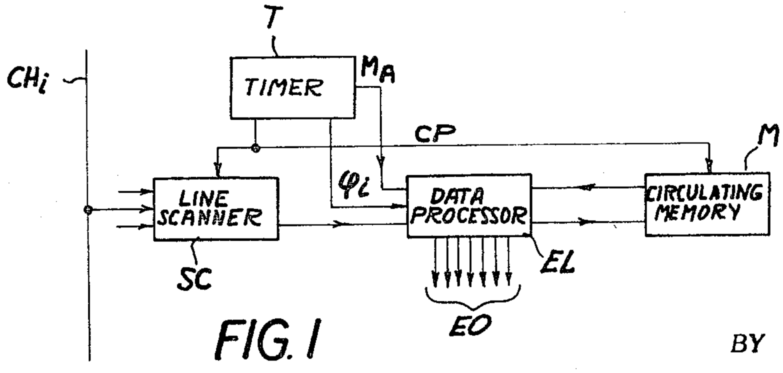
FIG. 1 is a block diagram showing the overall organization of a system according to our invention.

Although our invention is applicable to any type of telecommunication system, we shall describe it with particular reference to a telegraph or teleprinter system of the TDM type having a multiplicity of channels of which only one, designated $CH_i$, has been illustrated in FIG. 1. A line scanner SC, receiving a continuous train of clock pulses CP from a timer T, cyclically examines the potential of all the associated lines and, during a brief interval marked by the emission of a phasing pulse $\Phi$ by the timer, produces an input signal A (or $\bar{A}$) for a data processor EL in the presence (or absence) of voltage on channel $CH_i$. Data processor EL also receives from timer T a periodic sampling pulse $M_A$ recurring once every 64th scanning cycle and lasting as long as that cycle, i.e., 100$\mu$sec; see also FIG. 2 (*a*). A circulating memory M receives the output of data processor EL and returns it to that processor during every scanning cycle. Data processor EL is shown provided with a set of external output circuits EO terminating, for example, in respective flip-flops (not shown) forming part of a switching circuit for regenerating the detected signals from channel $CH_i$ to enable their retransmission over an outgoing local line; these flip-flops may be interconnected, as is well known per se, for mutual resetting so that only one of them can be set at any time.

Figure 2:
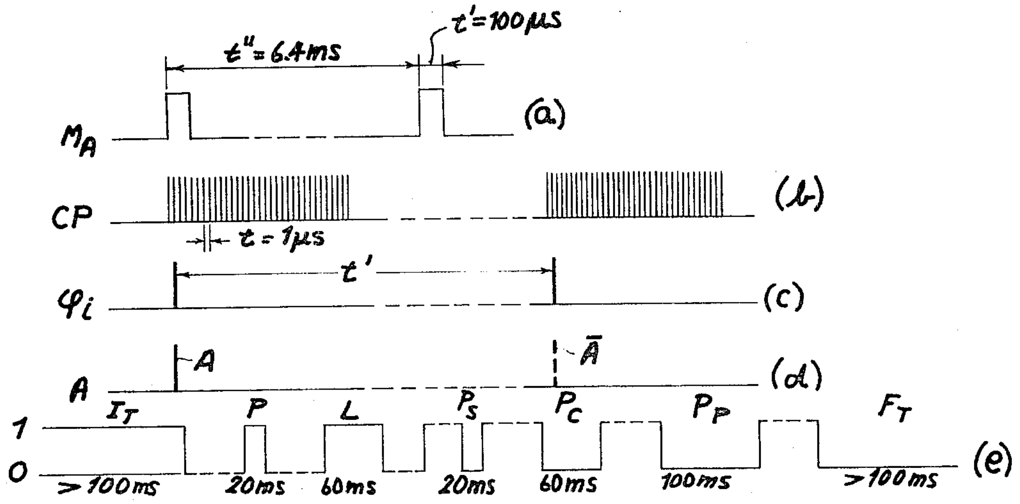
FIG. 2 is a set of graphs relating to the operation of the system of FIG. 1.

As shown in FIG. 2, the duration $t'$=100$\mu$sec. of any sampling pulse $M_A$, graph (a), corresponds to a train of 100 clock pulses CP of period $T$=1$\mu$sec., graph (b), and also equals the spacing of consecutive phasing $\Phi$, graph (c), which coincide with a finite input signal A or its inversion $\bar{A}$, graph (d). Graph (e) shows, for the purpose of comparison, the duration of the different DC line signals which the system is designed to detect, i.e., an extended state of energization (exceeding 100 msec.) representing a start-of-transmission signal $I_T$, an extended absence of voltage (also exceeding 100 msec.) representing an end-of-transmission signal $F_T$, a short voltage pulse P of 20 msec. representing a dot in Morse code, a grounding (deenergization) of the line for a like period representing a pause $P_S$ between signals, a longer voltage pulse L of 60 msec. duration constituting a dash in Morse code, a deenergization period of like duration representing an interval $P_C$ between characters, and a still longer period of zero voltage lasting for 100 msec. and indicating a gap $P_P$ between successive words. Naturally, these numerical values are given only by way of example.

Figure 3:
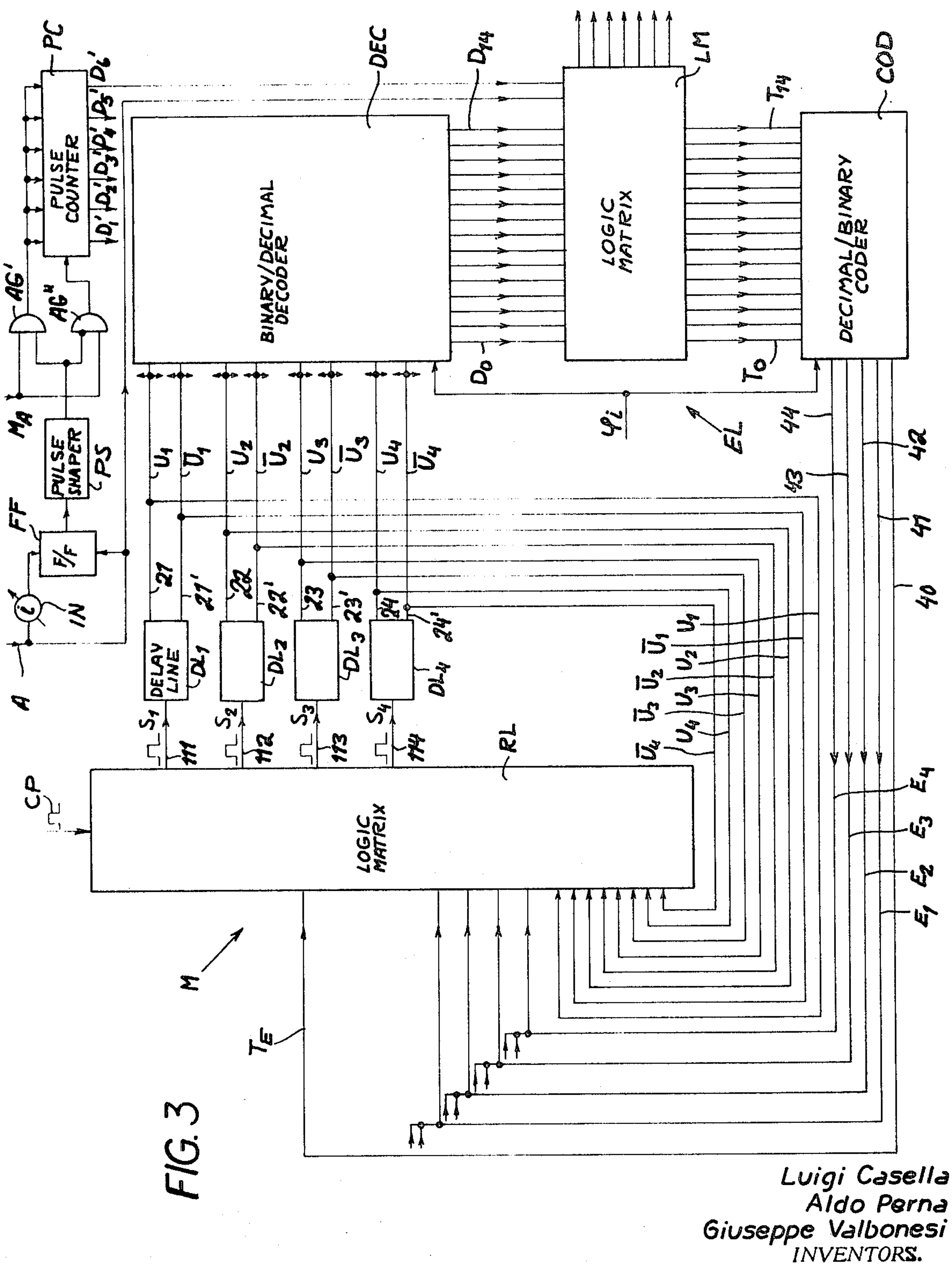
FIG. 3 is a more detailed circuit diagram of some of the constituents of the system of FIG. 1.

FIG. 3 shows details of the circulating memory M and the data processor EL, the latter including a binary/decimal decoder DEC, a logic matrix LM, and decimal/binary coder COD, a pulse counter PC and other circuitry described hereinafter. The memory M includes a logic matrix RL provided with four output leads 111, 112, 113, 114 terminating at respective delay lines $DL_1$, $DL_2$, $DL_3$, $DL_4$ each having a pair of output conductors 21, 21'; 22, 22'; 23, 23'; 24, 24'. On these output conductors there appear respective pulse pairs $U_1$, $\overline{U}_1$; $U_2$, $\overline{U}_2$; $U_3$, $\overline{U}_3$; and $U_4$, $\overline{U}_4$. The pulses $U_1$–$U_4$ represent the true values of bits inscribed in the respective delay lines whereas the pulses $\overline{U}_1$–$\overline{U}_4$ represent the inverted values of these bits.

A set of feedback loops 31, 31', 32, 32', 33, 33', 34, 34' extend from the output conductors 21, 21' etc., to the input side of the logic matrix RL for the purpose of reinscribing the bits $U_1$, $\overline{U}_1$ etc. on the delay lines where they are recirculated with a recurrence period or operating cycle of 100$\mu$sec. In addition, matrix RL has a number of input leads of which only five, numbered 40 to 44, have been illustrated. Other input leads, not shown, may be used for purposes not relevant to the present invention; thus, as described in application Ser. No. 735,606, such leads may be provided to inscribe the specific numerical values "0" or "1" in a particular time slot of the memory, or to increase or decrease the value of the inscribed code by "1." The illustrated leads 41, 42, 43 and 44 serve to enter respective bits $E_1$, $E_2$, $E_3$, $E_4$ of a new code in the memory upon concurrent energization of the entry lead 40 by a pulse $T_E$. If lead 40 is not energized, the previously registered code is reinscribed and recirculated as discussed above.

The code signals fed to delay lined $DL_1$–$DL_4$, shown at $S_1$–$S_4$ , are generated only in the presence of a clock pulse CP; thus, the length of each signal pulse is somewhat less than 1$\mu$sec., i.e., the duration of a memory phase. The actual mechanism for the entry of a bit into a delay line (especially one of the magnetostrictive type) may be more complex, as described in application Ser. No. 735,606, to ensure precise timing; for an understanding of our invention, however, these refinements are not essential.

Memory M is common to up to 100 data processors EL assigned to the several channels associated with scanner SC (FIG. 1), only the processor pertaining to channel $CH_i$ having been illustrated. The decoder DEC of this processor has its input connected to the conductors 21–24, 21'–24' of memory M and has a set of output leads $D_0$–$D_{14}$ feeding the logic matrix LM. The latter, in turn, is connected via similar leads $T_0$–$T_{14}$ to the decoder COD where the input leads 40–44 originate.

Another input lead to matrix LM carries the signal A (or $\overline{A}$) from scanner SC, this signal being further applied through an inverter into one input of a flip-flop FF whose other input directly receives the same signal A. Flip-flop FF has an output whenever it is switched from one state of conduction to the other, this output being applied through a pulse shaper PS to two AND-gates AG' and AG'' in parallel; AND gate AG'' has an inverting input for this pulse and, along with gate AG', also receives the sampling pulse $M_A$ without inversion. Pulse shaper PS broadens the changeover signal from flip-flop FF to make it coextensive with pulse $M_A$ so that AND-gate gate MG' conducts if the flip-flop is tripped whereas AND-gate AG'' conducts if no changeover takes place. In the latter instance, pulse $M_A$ steps a counter PC which has six stages with respective outputs $D_1'$–$D_6'$; only the last-mentioned output is of interest for the present system. If a reversal of flip-flop FF does occur, AND-gate AG' is traversed by a resetting pulse which zeroizes the counter PC regardless of the value of the count stored therein. Output $D_6'$ is connected to a further input of logic matrix LM.

Figure 4:
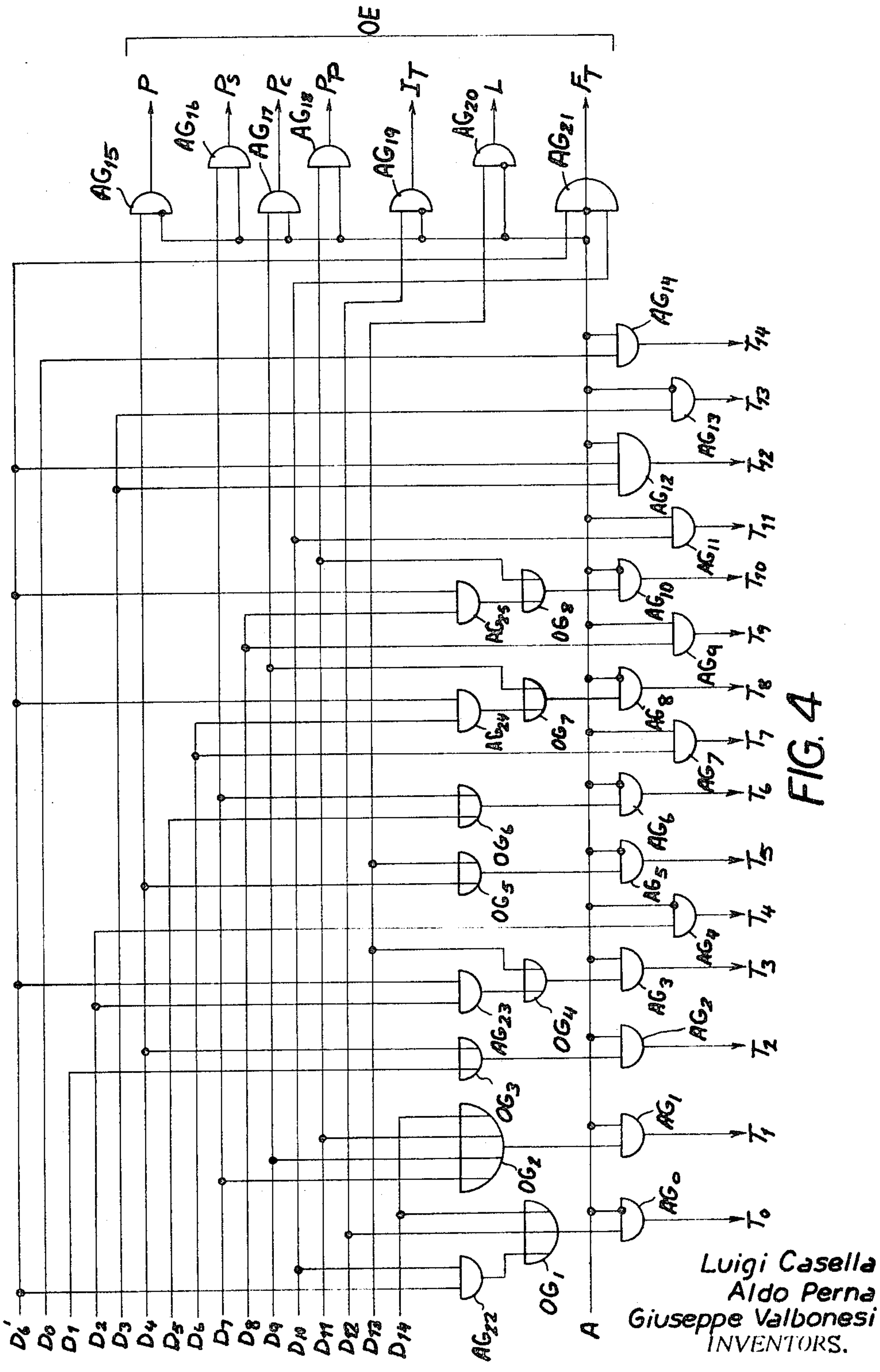
FIG. 4 is a detailed diagram of a logic matrix shown in FIG. 3.

FIG. 4 shows this logic matrix with its inputs $D_0$–$D_{14}$, $D_6'$ and A and with its external outputs OE carrying the various signals P, $P_S$, $P_C$, $P_P$, $I_T$, L, $F_T$ discussed in connection with FIG. 2(*e*).

The matrix comprises a set of AND-gates $AG_0$–$AG_{14}$, some of them with inverting inputs as conventionally indicated by large dots, feeding the leads $T_0$–$T_{14}$; other AND-gates $AG_{15}$–$AG_{21}$ for energizing the external outputs OE; and four AND-gates $AG_{22}$–$AG_{25}$ as well as OR gates $OG_1$–$OG_8$ preceding the AND-gates $AG_0$–$AG_{10}$. The leads terminating at AND-gates $AG_4$, $AG_7$, $AG_9$, $AG_1$, $AG_{13}$ and $AG_{14}$ may be described as internal output circuits since they serve only for the recirculation of a code signal relating to a transitory operating condition as more fully described hereinafter with reference to FIG. 6.

The following Table shows the logical equations, realized by the network of FIG. 4, for the several signals $T_0$–$T_{14}$, P, $P_S$, $P_C$, $P_P$, $I_T$, L, $F_T$:

TABLE $$P=D_4\overline{A} \quad L=D_{13}\overline{A} \quad I_T=D_{12}\overline{A}$$
$$P_S=D_7A \quad P_C=D_9A \quad P_P=D_{11}A \quad F_T=D_{10}\overline{A}D_6'$$
$$T_0=(D_{12}+D_{10}D_6'+D_{14})\overline{A}$$
$$T_1=(D_7+D_9+D_{11}+D_{14})A$$
$$T_2=(D_1+D_4)A$$
$$T_3=D_2D_6'+D_{13})A$$
$$T_4=D_2\overline{A}$$
$$T_5=(D_4+D_{13})\overline{A}$$
$$T_6=(D_5+D_7)\overline{A}$$
$$T_7=D_6A$$
$$T_8=(D_6D_6'+D_9)\overline{A}$$
$$T_9=D_8A$$
$$T_{10}=(D_8D_6'+D_{11})\overline{A}$$
$$T_{11}=D_{10}A$$
$$T_{12}=D_3AD_6'$$
$$T_{13}=D_3\overline{A}$$
$$T_{14}=D_0A$$

Figure 5:
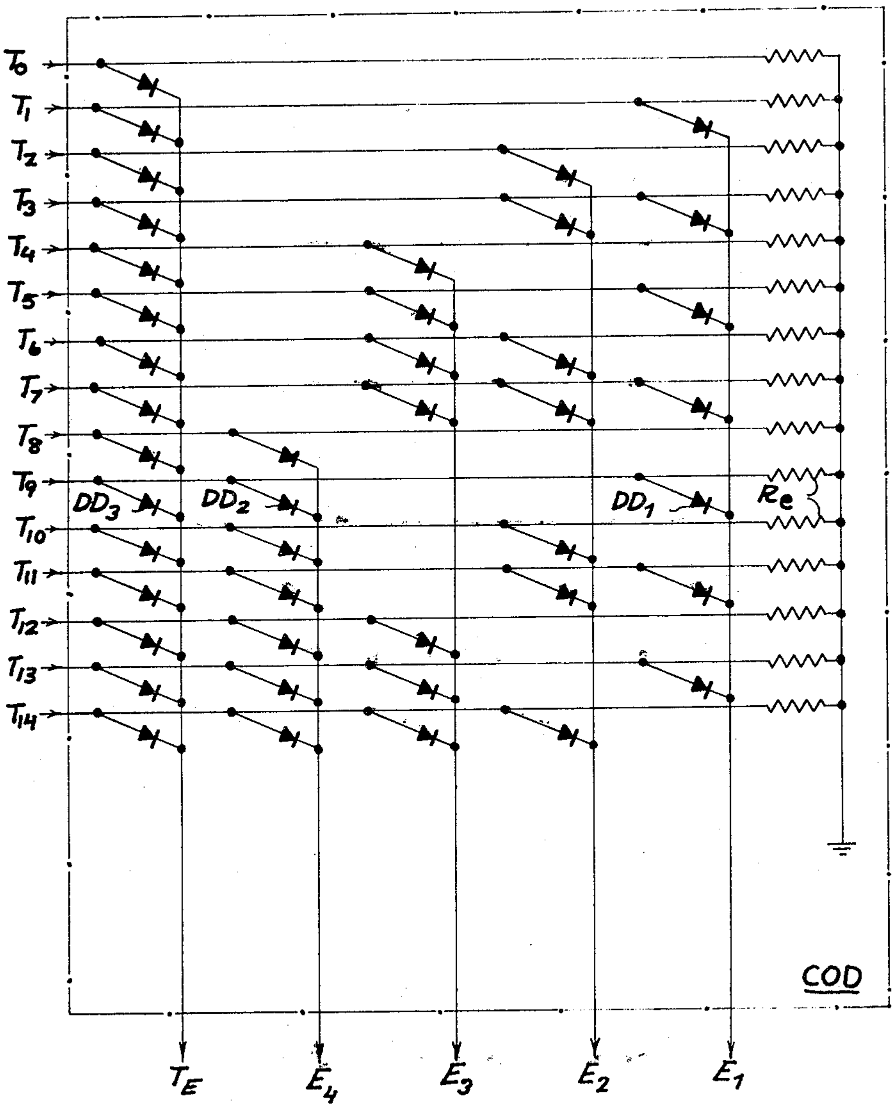
FIG. 5 is a similar diagram of a coding matrix also shown in FIG. 3.

As shown in FIG. 5, the coder COD comprises a set of individual resistors $R_e$ between input leads $T_0$–$T_{14}$ and ground as well as various combinations of diodes inserted between these input leads and output leads $E_1$–$E_4$. Lead $T_9$, for example, is connected via diodes $DD_1$ and $DD_2$ to leads $E_1$ and $E_2$, respectively, a further diode $DD_3$ connecting it to lead $T_E$ which is connected through similar diodes to all other input leads. With lead $T_9$ driven positive, leads $E_1$ and $E_4$ are energized to form the combination 1001 which is the binary equivalent of "9." An entry signal concurrently produced on lead $T_e$ conditions the memory M (FIG. 3) to store the "word " 1001 in the time slot assigned to the matrix LM and to the associated communication channel $CH_i$.

Figure 6:
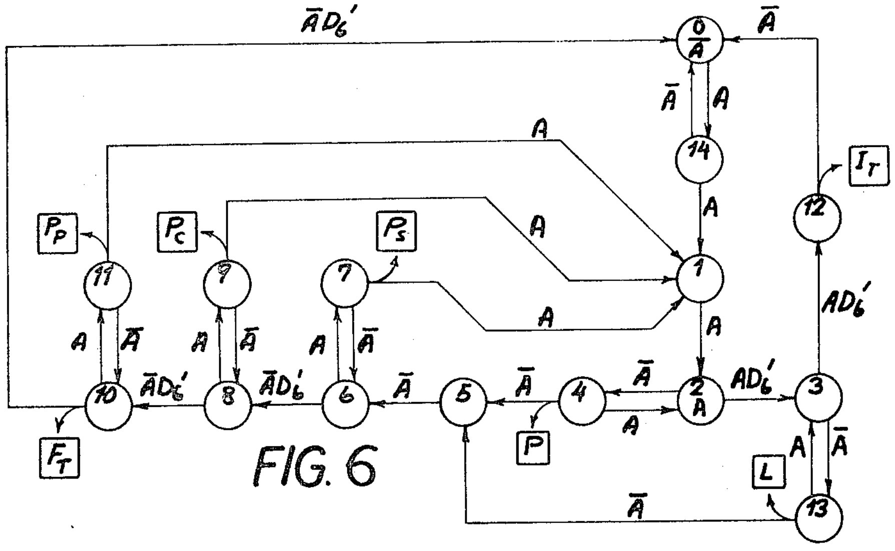
FIG. 6 is a flow diagram depicting the overall mode of operation of the system.

In FIG. 6 we have shown diagrammatically, by circles labeled 0–14, the various states of operation represented by the individual energization of respective output leads $T_0$–$T_{14}$ of matrix LM. It will be seen that, in a manner consistent with the logic functions given above, the occurrence of an input signal A in the quiescent 0 produces the temporary state 14 from which the system returns to 0 if the next input signal, received during the immediately following evaluation period, is $\overline{A}$. Otherwise, the system changes to state 1 whence, if the signal A continues, state 2 is reached. (The occurrence of the complement $\bar{A}$ at this instant has no effect.) From state 2 the system proceeds either to state 4 (signal $\bar{A}$) or, upon the coincidence of signals A and $D_6'$, to state 3; state 4 is unstable and reverts to state 2 in the presence of signal A, or progresses to state 5 (signal $\bar{A}$) with concurrent energization of gate $AG_{15}$ (FIG. 4) to denote the dot P. If, in state 3, signals A and $D_6'$ persist, condition 12 is reached which changes to the initial state 0 upon the occurrence of signal $\bar{A}$, with concurrent energization of gate $AG_{19}$ to indicate the beginning of transmission ($I_T$). If a signal $\bar{A}$ occurs in state 3, the unstable state 13 is reached with possible reversion to state 3 during the next evaluation period (signal A), or progress to state 5 (signal $\bar{A}$) with energization of AND-gate $AG_{20}$ to indicate a dash (L). The next signal $\bar{A}$, with the system is state 5, creates the state 6 whence a coincidence of signals $\bar{A}$ and $D_6'$ leads to the state 8; the continued presence of these two signals establishes first the state 10, with energization of AND-gate $AG_{21}$ and generation of the end-of-transmission signal $F_T$, followed by a return to state 0 if the input criteria do not change. From states 6, 8 and 10 the system may shift, in the presence of a signal A, to unstable conditions 7, 9 and 11, respectively, followed by either a return to the previous state (signal $\bar{A}$) or a reversion to state 1 (signal A); the last-mentioned shift energizes the AND-gate $AG_{16}$, $AG_{17}$ or $AG_{18}$ to indicate the pauses $P_S$, $P_C$ and $P_P$, respectively.

In the system specifically disclosed, the continuity signal $D_6'$ comes into existence only when the condition of the channel under test remains unchanged for a minimum of 38.4 msec.

Although described particularly for the transmission of telegraphy codes, our invention may also be utilized in telephone exchanges, e.g., for discriminating between interdigit pauses and other intervals of different duration. Reference in this connection may be made to our copending application Ser. No. 30,132 filed on even date herewith. Furthermore, as described in the last-mentioned application, a pulse counter such as the one shown at PC in FIG. 3 may be constituted by an otherwise unassigned phase of circulating memory M, with the output of AND-gate AG′ applied to an "Inscribe 0" input and that of gate AG″ applied to an "Add 1" input of that memory during the occurrence of a particular clock pulse CP; pulse $D_6'$ is then derived during the corresponding phase from the output of decoder DEC and is stored for the necessary length of time in a buffer register included in logic matrix LM.

We claim:

1. In a telecommunication system having at least one channel with two significant states of energization subject to changeover at intervals of different duration, the combination therewith of sampling means for periodically determining the state of energization of said channel; data processing means connected to said sampling means for receiving an input signal characteristic of said state of energization during successive evaluation periods and for deriving therefrom a corresponding output signal, said data processing means including detector means for ascertaining a change in said input signal indicative of a changeover in said state of energization between successive evaluation periods; counting means in said data processing means responsive to said detector means for generating a continuity signal upon said input remaining unchanged for a predetermined number of consecutive evaluation periods; a logical circuitry in said data processing means for modifying the output signal derived from an input signal during any evaluation period in response to said continuity signal.

2. The defined in claim 1, further comprising storage means connected to said data processing means for preserving the output signal thereof to at least the next evaluation period, said logical circuitry being responsive to said storage means for further modifying an instant output signal in accordance with the output signal preserved from the preceding evaluation period.

3. The combination defined in claim 2 wherein said storage means comprises a circulating memory.

4. The combination defined in claim 3 wherein said sampling means comprises a scanner for a multiplicity of channels and a source of timing pulses recurring after a predetermined number of scanning cycles.

5. The combination defined in claim 4 wherein said memory has an operating cycle equal to a scanning cycle for the recirculation of a digital code corresponding to said output signal.

6. The combination defined in claim 2 wherein said logical circuitry is provided with a group of external output circuits and with a group of internal output circuits, said internal output circuits being energizable only temporarily, for a single evaluation period, in response to certain combinations of signals from said scanning means and said storage means to indicate a transitory condition to be converted into a definite state, with energization of a corresponding external output, during the next evaluation period, said storage means being connected to both said groups for registering the output signals thereof.

* * * * *